United States Patent
Huq et al.

(10) Patent No.: US 11,235,804 B2
(45) Date of Patent: Feb. 1, 2022

(54) AUTOMATED VEHICLE LANE CHANGE CONTROL TECHNIQUES

(71) Applicants: Mohammad S Huq, Hamtramck, MI (US); Javon D Pool, Ypsilanti, MI (US)

(72) Inventors: Mohammad S Huq, Hamtramck, MI (US); Javon D Pool, Ypsilanti, MI (US)

(73) Assignee: FCA US LLC, Auburn Hills, MI (US)

( * ) Notice: Subject to any disclaimer, the term of this patent is extended or adjusted under 35 U.S.C. 154(b) by 275 days.

(21) Appl. No.: 16/533,229

(22) Filed: Aug. 6, 2019

(65) Prior Publication Data

US 2021/0039714 A1 Feb. 11, 2021

(51) Int. Cl.
*B62D 15/00* (2006.01)
*B62D 15/02* (2006.01)
*B62D 6/00* (2006.01)

(52) U.S. Cl.
CPC ........... *B62D 15/0255* (2013.01); *B62D 6/00* (2013.01)

(58) Field of Classification Search
USPC .............................................. 701/36, 41–44
See application file for complete search history.

(56) References Cited

U.S. PATENT DOCUMENTS

| | | | | |
|---|---|---|---|---|
| 8,170,739 B2 * | 5/2012 | Lee | .................... | B62D 15/0255 701/25 |
| 8,930,063 B2 * | 1/2015 | Gandhi | ................ | G01S 7/4026 701/31.1 |
| 2010/0228417 A1 | 9/2010 | Lee et al. | | |
| 2015/0353085 A1 * | 12/2015 | Lee | ........................ | B60W 30/12 701/533 |
| 2015/0355641 A1 * | 12/2015 | Choi | ...................... | G05D 1/021 701/23 |
| 2017/0240186 A1 * | 8/2017 | Hatano | ........... | B60W 30/18163 |

(Continued)

FOREIGN PATENT DOCUMENTS

| CN | 101837781 A | 9/2010 |
|---|---|---|
| CN | 102609765 A | 7/2012 |

(Continued)

OTHER PUBLICATIONS

Zhi-qiang Liu et al., "Research on Local Dynamic Path Planning Method for Intelligent Vehicle Lane-Changing", Hindawi Journal of Advanced Transportation, vol. 2019, Article ID 4762658, 10 pages. (2019).

*Primary Examiner* — Jonathan L Sample
(74) *Attorney, Agent, or Firm* — Ralph E. Smith

(57) ABSTRACT

Automated vehicle lane change systems and methods comprise determining a departing lane in which the vehicle is currently traveling and a merging lane in which the vehicle will be traveling after an automated lane change, determining a desired yaw rate of the vehicle based on a current speed of the vehicle, determining an end control point in each of a departing lane and a merging lane, determining a set of intermediate control points based on the end control points and the desired yaw rate, determining a basis spline (B-spline) defined by the end control points and the set of intermediate control points to obtain a desired path between the end control points, and commanding a steering system configured to control steering of the vehicle such that the vehicle follows the desired path.

14 Claims, 4 Drawing Sheets

(56) References Cited

U.S. PATENT DOCUMENTS

| | | | |
|---|---|---|---|
| 2018/0120859 A1* | 5/2018 | Eagelberg | B60W 60/00274 |
| 2018/0284266 A1* | 10/2018 | Talamonti | G05D 1/0214 |
| 2018/0345991 A1* | 12/2018 | Mimura | B60W 30/18163 |
| 2018/0373250 A1* | 12/2018 | Nakamura | G05D 1/0061 |
| 2019/0016339 A1* | 1/2019 | Ishioka | G05D 1/0223 |
| 2019/0071076 A1* | 3/2019 | Nakatsuka | B60W 30/143 |
| 2019/0071094 A1* | 3/2019 | Nishiguchi | B62D 15/0255 |
| 2019/0071099 A1* | 3/2019 | Nishiguchi | B62D 15/0255 |
| 2019/0077404 A1* | 3/2019 | Takeda | G08G 1/16 |
| 2019/0080601 A1* | 3/2019 | Kawabe | B60W 50/00 |
| 2019/0084561 A1* | 3/2019 | Takeda | B60W 30/0956 |
| 2019/0107842 A1* | 4/2019 | Miura | G05D 1/0257 |
| 2019/0143972 A1* | 5/2019 | Ishioka | B60W 30/162 |
| | | | 701/70 |
| 2019/0315348 A1* | 10/2019 | Mimura | G01C 21/3632 |
| 2019/0359209 A1* | 11/2019 | Mizutani | B60W 30/12 |
| 2020/0172123 A1* | 6/2020 | Kubota | B60W 60/0053 |

FOREIGN PATENT DOCUMENTS

| | | |
|---|---|---|
| CN | 106926844 A | 7/2017 |
| CN | 107298103 A | 10/2017 |

* cited by examiner

AUTOMATED VEHICLE LANE CHANGE CONTROL TECHNIQUES

FIELD

The present application generally relates to autonomous vehicle driving and, more particularly, to automated vehicle lane change control techniques.

BACKGROUND

During autonomous driving, a vehicle could perform an automated lane change provided certain preconditions are satisfied (e.g., a portion of a target or merging lane is clear of other vehicles). When the preconditions are satisfied, a steering system of the vehicle is commanded such that the vehicle moves from a departing lane in which the vehicle is currently traveling to the merging lane. Conventional automated lane change systems could potentially be perceived as rough or jerky due to the force required to be applied by the steering system, such as at the start and end points of the automated lane change procedure. This could be particularly true at higher vehicle speeds and for non-linear (i.e., curving) roadways. Such applied force could be potentially perceived as increased noise, vibration, and/or harshness (NVH) and could be undesirable to a driver of the vehicle. Accordingly, while conventional automated lane change systems do work for their intended purpose, there remains a need for improvement in the relevant art.

SUMMARY

According to one example aspect of the invention, an automated lane change control system for a vehicle is presented. In one exemplary implementation, the automated lane change control system comprises: a steering system configured to control steering of the vehicle and a controller configured to: detect whether a set of preconditions for performing an automated lane change on a roadway are satisfied and when the set of preconditions for performing the automated lane change on the roadway are satisfied, perform the automated lane change by determining a departing lane of the roadway in which the vehicle is currently traveling and a merging lane of the roadway to which the vehicle will be traveling after performing the automated lane change, determining a desired yaw rate of the vehicle based on a current speed of the vehicle, determining an end control point in each of the departing lane and the merging lane, determining a set of intermediate control points based on the end control points and the desired yaw rate, determining a basis spline (B-spline) defined by the end control points and the set of intermediate control points to obtain a desired path between the end control points, and commanding the steering system such that the vehicle follows the desired path.

In some implementations, the B-spline is defined by six control points comprising the end control points and four intermediate control points that form the set of intermediate control points. In some implementations, the six control points for the B-spline comprise: (i) the end control point (A) in the departing lane, wherein the control point A is a center of the departing lane, (ii) the end control point (B) in the merging lane, wherein the control point B is a center of the merging lane, (iii) an intermediate control point ($B_{pre}$) before and along a line ($L_B$) that is tangent to a curvature of the merging lane, (iv) an intermediate control point ($A_{post}$) after and along a line ($L_A$) that is tangent to a curvature of the departing lane, (v) an intermediate control point ($P_1'$) along a line ($L_1$) that is tangent to a line ($AB_{pre}$) connecting end control point A point to intermediate control point $B_{pre}$, and (vi) an intermediate control point ($P_2'$) along another line ($L_2$) that is tangent to line $AB_{pre}$.

In some implementations, the end control point B is selected such that the following constraint is satisfied:

$$AB/V < (\Theta_1 + \Theta_2)/Y_{des},$$

where AB represents a distance between the end control points A and B, V represents the speed of the vehicle, $\Theta_1$ represents an acute angle between lines $AB_{pre}$ and $L_B$, $\Theta_2$ represents an acute angle between lines $AB_{pre}$ and $L_A$, and $Y_{des}$ represents the desired yaw rate. In some implementations, the controller is further configured to: determine two points ($p_1$, $p_2$) along line $AB_{pre}$ that are equally spaced between end control point A and intermediate control point $B_{pre}$, determine lines $L_1$ and $L_2$ by determining tangents to line $AB_{pre}$ that pass through points $p_1$ and $p_2$, respectively, determine the intermediate control points ($P_1$, $P_2$) at intersections between lines $L_1$ and $L_A$ and between lines $L_2$ and $L_B$, respectively, and determine the control points $P_1'$, $P_2'$ by determining mid-points along line $L_1$ between points $p_1$ and $P_1$ and along line $L_2$ between points $p_2$ and $P_2$, respectively.

In some implementations, the automated lane change control system further comprises a camera system configured to capture images of the roadway, and the controller is further configured to: obtain first captured images of the roadway from the camera system, detect, based on the first captured images, first lane markers on the roadway corresponding to the departing and merging lanes, identify first segments of the departing and merging lanes based on the detected first lane markers in the first captured images, and determine the end control points in the departing and merging lanes within the identified first segments. In some implementations, the desired yaw rate is a maximum yaw rate of the vehicle at the current speed of the vehicle. In some implementations, the set of preconditions comprises at least a portion of the merging lane being free of other vehicles.

In some implementations, the controller is further configured to after determining the desired path and commanding the steering system to follow the desired path for a period and before the automated lane change is complete: obtain second captured images of the roadway from the camera system, detect, based on the second captured images, second lane markers on the roadway corresponding to the departing and merging lanes, identify second segments of the departing and merging lanes based on the detected second lane markers in the second captured images, wherein the second segments are shorter than the first segments by a distance traveled by the vehicle during the period, update the end control point in the merging lane and the set of intermediate control points within the identified segments, determine a B-spline defined by the end control point in the departing lane, the updated end control point in the merging lane, and the updated set of intermediate control points to obtain an updated desired path, and command the steering system such that the vehicle follows the updated desired path.

According to another example aspect of the invention, an automated lane change control method for a vehicle is presented. In one exemplary implementation, the method comprises: detecting, by a controller of the vehicle, whether a set of preconditions for performing an automated lane change on a roadway are satisfied and when the set of preconditions for performing the automated lane change on the roadway are satisfied, performing the automated lane change by determining, by the controller, a departing lane of the roadway in which the vehicle is currently traveling and a merging lane of the roadway to which the vehicle will be traveling after performing the automated lane change, determining, by the controller, a desired yaw rate of the vehicle based on a current speed of the vehicle, determining, by the controller, an end control point in each of the departing lane and the merging lane, determining, by the controller, a set of intermediate control points based on the end control points and the desired yaw rate, determining, by the controller, a basis spline (B-spline) defined by the end control points and the set of intermediate control points to obtain a desired path between the end control points, and commanding, by the controller, a steering system configured to control steering of the vehicle such that the vehicle follows the desired path.

In some implementations, the B-spline is defined by six control points comprising the end control points and four intermediate control points that form the set of intermediate control points. In some implementations, the six control points for the B-spline comprise: (i) the end control point (A) in the departing lane, wherein the control point A is a center of the departing lane, (ii) the end control point (B) in the merging lane, wherein the control point B is a center of the merging lane, (iii) an intermediate control point ($B_{pre}$) before and along a line ($L_B$) that is tangent to a curvature of the merging lane, (iv) an intermediate control point ($A_{post}$) after and along a line ($L_A$) that is tangent to a curvature of the departing lane, (v) an intermediate control point ($P_1'$) along a line ($L_1$) that is tangent to a line ($AB_{pre}$) connecting end control point A point to intermediate control point $B_{pre}$, and (vi) an intermediate control point ($P_2'$) along another line ($L_2$) that is tangent to line $AB_{pre}$.

In some implementations, the end control point B is selected such that the following constraint is satisfied:

$$AB/V \leq (\Theta_1 + \Theta_2)/Y_{des},$$

where AB represents a distance between the end control points A and B, V represents the speed of the vehicle, $\Theta_1$ represents an acute angle between lines $AB_{pre}$ and $L_B$, $\Theta_2$ represents an acute angle between lines $AB_{pre}$ and $L_A$, and $Y_{des}$ represents the desired yaw rate. In some implementations, the method further comprises determining, by the controller, two points ($p_1$, $p_2$) along line $AB_{pre}$ that are equally spaced between end control point A and intermediate control point $B_{pre}$, determining, by the controller, lines $L_1$ and $L_2$ by determining tangents to line $AB_{pre}$ that pass through points $p_1$ and $p_2$, respectively, determining, by the controller, the intermediate control points ($P_1$, $P_2$) at intersections between lines $L_1$ and $L_A$ and between lines $L_2$ and $L_B$, respectively, and determining, by the controller, the control points $P_1'$, $P_2'$ by determining mid-points along line $L_1$ between points $p_1$ and $P_1$ and along line $L_2$ between points $p_2$ and $P_2$, respectively.

In some implementations, the method further comprises: obtaining, by the controller, first captured images of the roadway from a camera system configured to capture images of the roadway, detecting, by the controller and based on the first captured images, first lane markers on the roadway corresponding to the departing and merging lanes, identifying, by the controller, first segments of the departing and merging lanes based on the detected first lane markers in the first captured images, and determining, by the controller, the end control points in the departing and merging lanes within the identified first segments. In some implementations, the desired yaw rate is a maximum yaw rate of the vehicle at the current speed of the vehicle. In some implementations, the set of preconditions comprises at least a portion of the merging lane being free of other vehicles.

In some implementations, the method further comprises after determining the desired path and commanding the steering system to follow the desired path for a period and before the automated lane change is complete: obtaining, by the controller, second captured images of the roadway from the camera system, detecting, by the controller and based on the second captured images, second lane markers on the roadway corresponding to the departing and merging lanes, identifying, by the controller, second segments of the departing and merging lanes based on the detected second lane markers in the second captured images, wherein the second segments are shorter than the first segments by a distance traveled by the vehicle during the period, updating, by the controller, the end control point in the merging lane and the set of intermediate control points within the identified segments, determining, by the controller, a B-spline defined by the end control point in the departing lane, the updated end control point in the merging lane, and the updated set of intermediate control points to obtain an updated desired path, and commanding, by the controller, the steering system such that the vehicle follows the updated desired path.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously mentioned, conventional automated lane change systems potentially suffer from rough or jerky lane changes, which could be noticeable to a driver of the vehicle as noise, vibration, and/or harshness (NVH). Accordingly, smoother vehicle automated lane change techniques are presented. These techniques determine end control points (e.g., center points) in the departing and merging lanes and a desired (e.g., optimal) path therebetween based on a desired (e.g., maximum) yaw rate of the vehicle and a speed of the vehicle. A steering system of the vehicle is then commanded such that the vehicle follows the desired path. In one exemplary implementation, the desired path is a basis spline (also known as a "B-spline") defined by six control points, two of which are the end control points in the departing and merging lanes. The remainder of the control points are intermediate control points determined based on these two end control points and, in some cases, constraints based on the vehicle speed and the desired vehicle yaw rate are applied. In another exemplary implementation, the end control point in the merging lane, the intermediate control points, and the desired path therebetween are subsequently updated after a period and prior to a completion of the automated lane change based on camera images of the roadway. The end control point in the departing lane, however, remains static.

Figure 1:
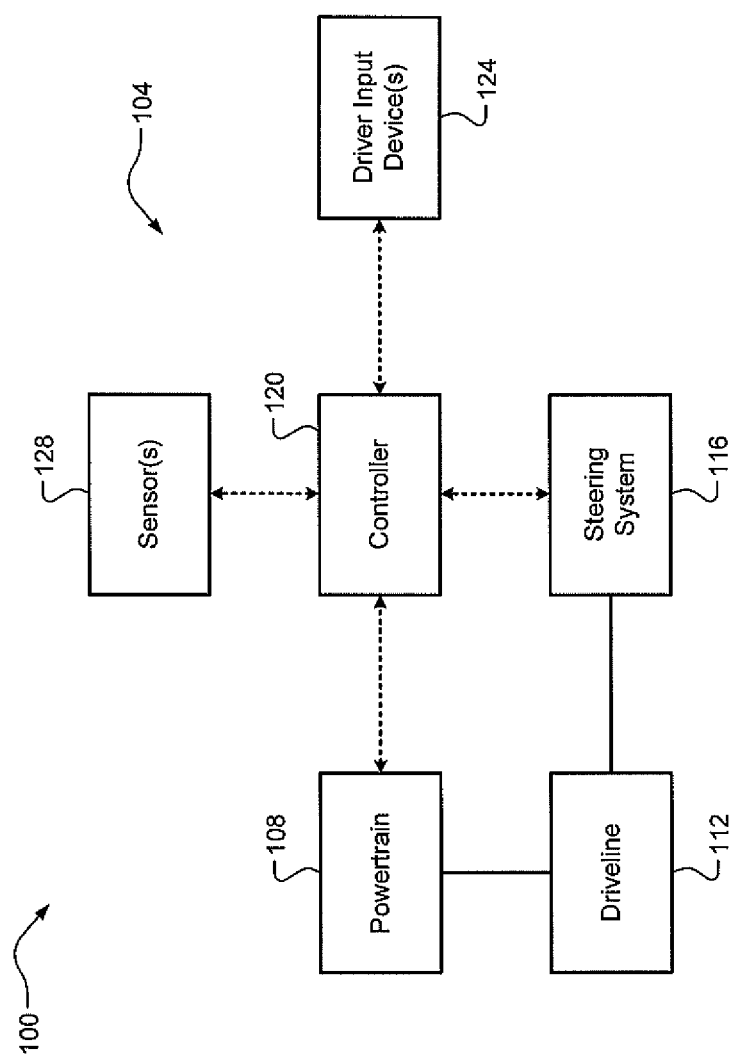
FIG. 1 is a functional block diagram of an example vehicle having an automated lane change control system according to the principles of the present disclosure.

Referring now to FIG. 1, a functional block diagram of an example vehicle 100 having an automated lane change control system 104 according to the principles of the present disclosure is illustrated. The vehicle 100 comprises a powertrain 108 (an engine and/or electric motor, a transmission, etc.) that generates drive torque, which is transferred to a driveline 112 of the vehicle 100 for propulsion. A steering system 116 controls steering of the vehicle 100 via the driveline 112. A controller 120 controls operation of the vehicle 100, including controlling the powertrain 108 to generate a desired amount of drive torque to meet a torque request. The controller 120 also controls the steering system 116. The control of the powertrain 108 and the steering system 116 could be based on, at least in part, inputs received via a set of driver input devices 124. Non-limiting examples of the set of driver input devices 124 include an accelerator pedal, a brake pedal, a transmission gear shift selector, and a steering wheel. A set of sensors 128 measure vehicle operating parameters. Non-limiting examples of the set of sensors 128 include a vehicle speed sensor, an exterior camera system, and driver attention sensors, such as steering wheel contact sensors.

The automated lane change control system 104 generally comprises the steering system 116, the controller 120, and at least some of the set of sensors 128. In particular, the automated lane change control system 104 could utilize a vehicle speed sensor and an exterior camera system of the set of sensors 128. During autonomous driving, the automated lane change control system 104 is capable of performing an automated lane change from a departing lane in which the vehicle 100 is currently traveling to a target or merging lane in which the vehicle 100 will be traveling once the automated lane change is complete. The controller 120 could first determine whether a set of preconditions for performing the automated lane change procedure are satisfied. This could include, for example only, a portion of the merging lane being free of other vehicles. It will be appreciated that other suitable preconditions could be utilized, such as vehicle speed being within an appropriate range for the automated lane change procedure and verification of the driver's attention (e.g., via steering wheel contact sensors).

Figure 2A:
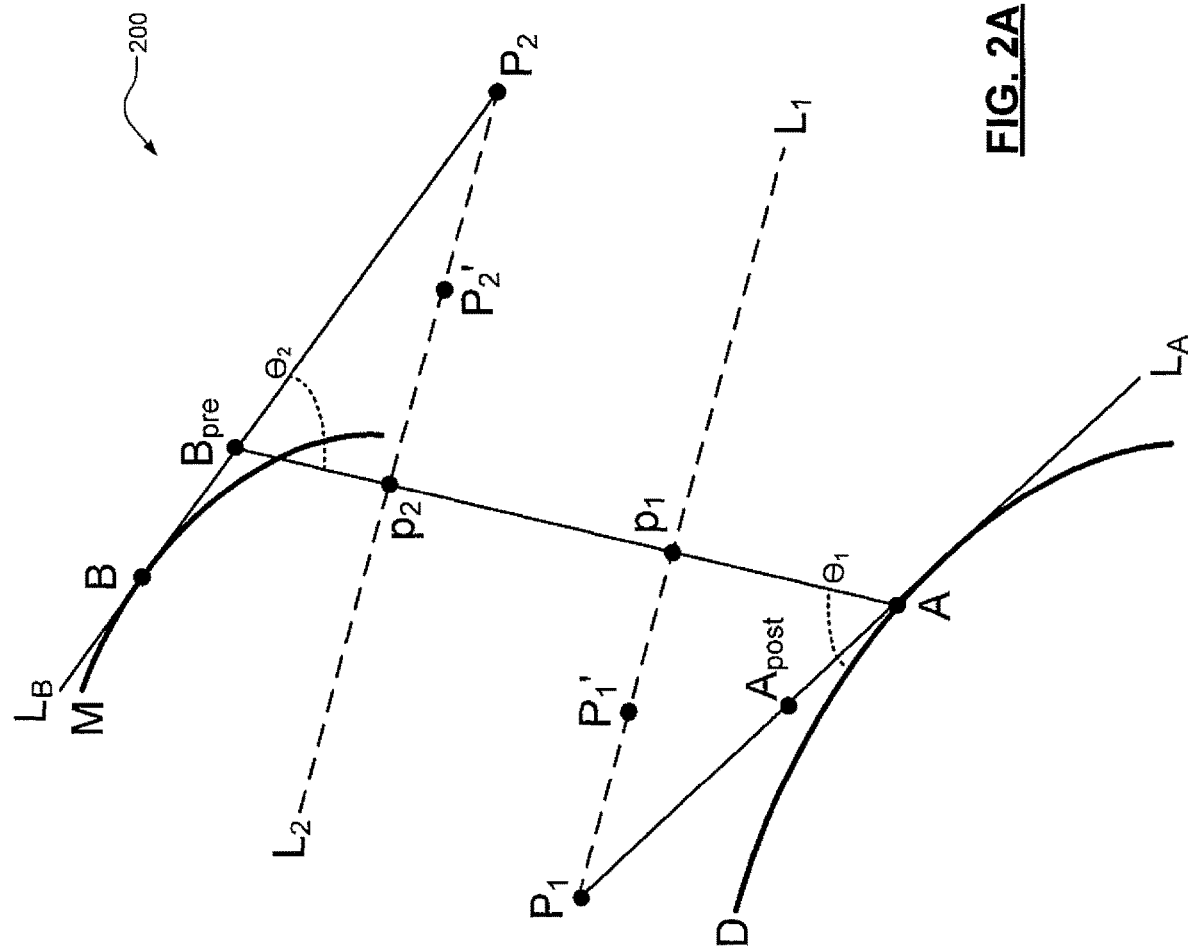
FIGS. 2A-2B are overhead views of an example automated lane change procedure and an example desired path for the automated lane change procedure according to the principles of the present disclosure.
Figure 2B:
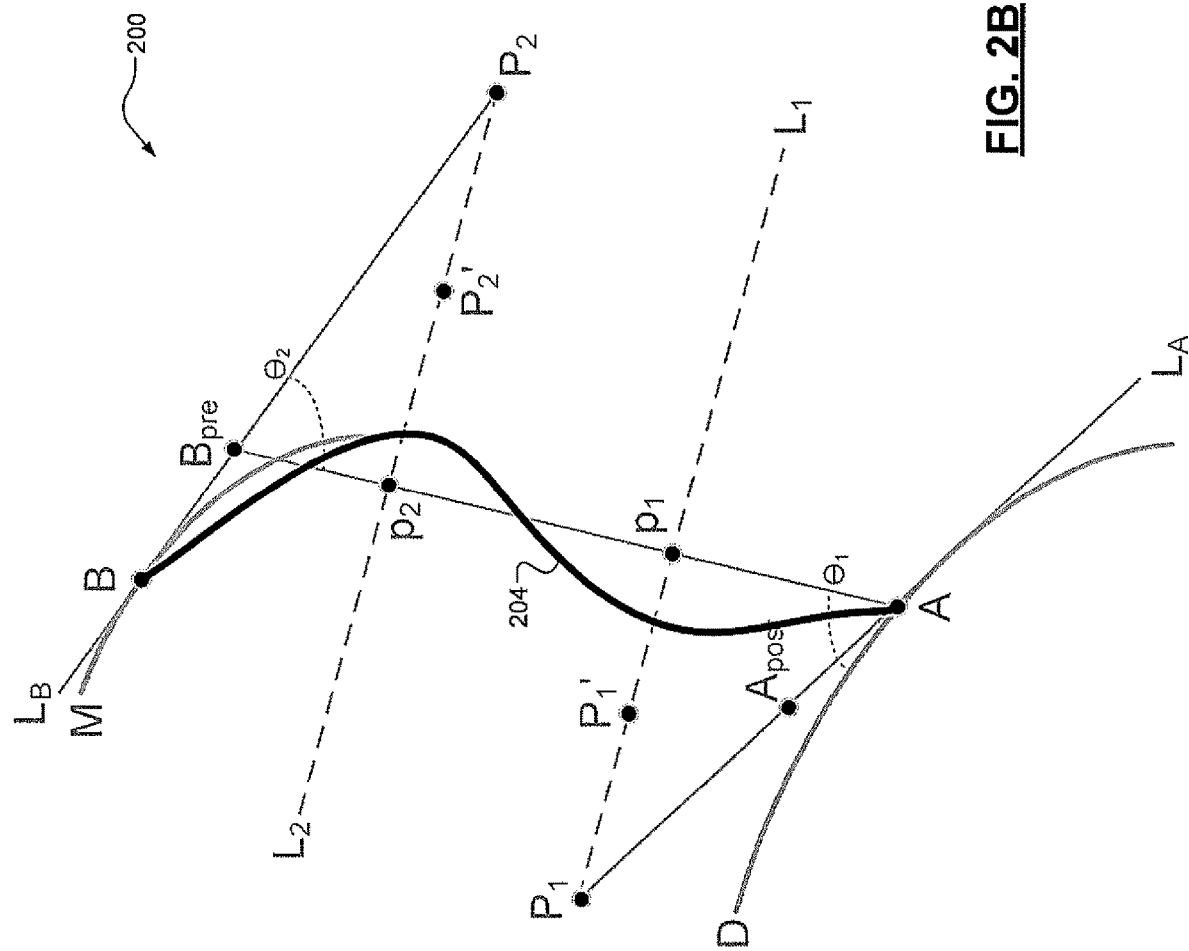

Referring now to FIGS. 2A-2B, an overhead view 200 of an example automated lane change procedure and an example desired path 204 for the automated lane change procedure according to the principles of the present disclosure are illustrated. As shown, the vehicle 100 is traveling in a left curving departing lane defined by a center line D and an automated lane change procedure to another left curving merging lane defined by a center line M is to be performed. These center lines D and M of the departing and merging lanes, respectively, could be determined, for example, based on detected lane line markers (e.g., using the set of sensors 128, such as a camera system). An end control point (A) in the departing lane along center line D and an end control point (B) in the merging lane along center line M are initially selected. Lines $L_A$ and $L_B$, which are tangent to the curvature of center lines D and M at end control points A and B, respectively, are determined next. Using the tangents to the curvature of the departing and merging lanes as the end control points could provide for the smoothest possible automated lane change procedure compared to rough or jerky steering actions at or near these end control points as is performed by conventional automated lane change systems.

Along lines $L_A$ and $L_B$, intermediate control points $A_{post}$ and $B_{pre}$ are selected, with intermediate control point $A_{post}$ being after end control point A and intermediate control point $B_{pre}$ being before end control point B with respect to the vehicle's motion. The distance of these intermediate control points $A_{post}$ and $B_{pre}$ from respective end control points A and B could be predetermined or could be based on operating conditions such as vehicle speed, desired vehicle yaw rate, and lane curvature. A line ($AB_{pre}$) connecting end control point A to intermediate control point $B_{pre}$ is then determined. Two points ($p_1$, $p_2$) along line $AB_{pre}$ that are equally spaced between end control point A and intermediate control point $B_{pre}$ are then determined. Lines $L_1$ and $L_2$, which are each tangent to line $AB_{pre}$ and pass through respective points $p_1$ and $p_2$ are then determined. The intersections between lines $L_1$ and $L_2$ and lines $L_A$ and $L_B$ are then identified to determined points $P_1$ and $P_2$. The remaining intermediate control points ($P_1'$, $P_2'$) are finally determined by identifying mid-points along line $L_1$ between points $p_1$ and $P_1$ and along line $L_2$ between points $p_2$ and $P_2$, respectively. These six control points (A, $A_{post}$, $P_1'$, $P_2'$, $B_{pre}$, and B) are then utilized to determine a desired path for the vehicle to follow during the automated lane change procedure.

In one exemplary implementation as shown in FIG. 2B, the desired path 204 is a B-spline defined by these six control points. The B-spline path 204 connects end control points A and B, but does not actually pass through any of the intermediary control points $A_{post}$, $P_1'$, $P_2'$, or $B_{pre}$. Instead, the B-spline path 204 curves between these intermediary control points $A_{post}$, $P_1'$, $P_2'$, and $B_{pre}$. It will be appreciated that a B-spline defined by these six control points is merely one example of the desired path for performing the automated lane change procedure. In one exemplary implementation, the end control point B is initially selected such that the following constraint is satisfied:

$$AB/V < (\Theta_1 + \Theta_2)/Y_{des},$$

where AB represents a distance between the end control points A and B, V represents the speed of the vehicle, $\Theta_1$ represents an acute angle between lines $AB_{pre}$ and $L_B$, $\Theta_2$ represents an acute angle between lines $AB_{pre}$ and $L_A$, and $Y_{des}$ represents the desired yaw rate.

As mentioned above, the B-spline desired path 204 is merely one example of the desired path for the automated lane change procedure. That is, it will be appreciated that other types of paths could be determined between the end control points using the intermediate control points. This could be particularly true, for example, when the desired path is being continuously updated or "re-drawn" during the automated lane change procedure. This continuous updating process could be performed based on camera images that are being continuously captured by the set of sensors 128 (e.g., a front-facing camera system). The starting end control point A, however, will be known and should remain static when updating the intermediate control points and the end control point B. By continuously updating the control points and the desired path, the automated lane change procedure could be smoother. For example, lane conditions could change or the vehicle 100 could accidentally veer off of the desired path, and thus this updating could result in the vehicle 100 being able to self-correct and regain the desired path to smoothly complete the automated lane change procedure.

Figure 3:
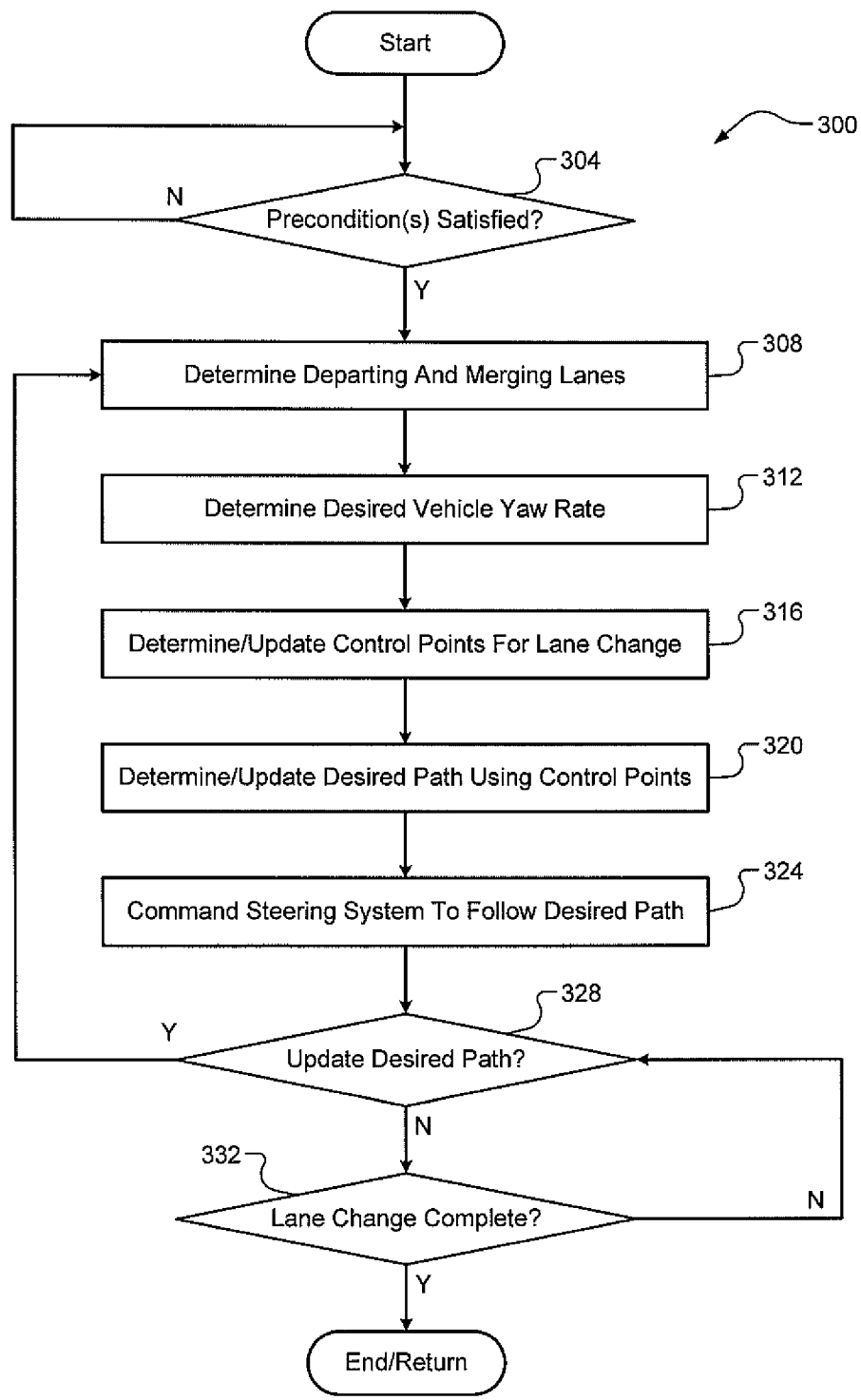
FIG. 3 is a flow diagram of an example automated lane change method for a vehicle according to the principles of the present disclosure.

Referring now to FIG. 3, a flow diagram of an example automated lane change method 300 according to the principles of the present disclosure is illustrated. At 304, the controller 120 determines whether a set of preconditions for performing the automated lane change procedure are satisfied. This could include, for example only, at least a portion of the merging lane being free of other vehicles. It will be appreciated that other suitable preconditions may need to be satisfied, such as vehicle speed being within a certain range and the driver of the vehicle maintaining at least a certain level of attentiveness. When the set of preconditions are satisfied, the method 300 proceeds to 308. Otherwise, the method 300 ends or returns to 304. At 308, the controller 120 determines the departing and merging lanes (e.g., based on camera images from the set of sensors 128). At 312, the controller 120 determines a desired vehicle yaw rate. This could be, for example only, a maximum acceptable yaw rate at a current speed of the vehicle 100. At 316, the controller 120 determines or updates the control points for the automated lane change procedure as previously described herein.

At 320, the controller 120 determines or updates the desired path using the control points and the desired vehicle yaw rate. The desired path could be, for example, a B-spline path defined by the six control points as previously described herein, but it will be appreciated that other suitable paths could be determined, particularly when continuous updating of the desired path is being performed. At 324, the controller 120 commands the steering system 116 such that the vehicle 100 follows the desired path. At 328, the controller 120 determines whether the desired path needs to be updated. This could be, for example, automatic (e.g., according to a defined update frequency) or could be in response to detected changes in conditions (vehicle speed, lane curvature, the vehicle veering off of the desired path, etc.). When updating is required, the method 300 returns to 308 and the process repeats to update the control points and the desired path. When updating is not required, the method 300 proceeds to 332 where the controller 120 determines whether the automated lane change procedure has completed. When true, the method 300 ends or returns to 304. Otherwise, the method 328 returns to 328 and the controller 120 continues to determine whether updating is required.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An automated lane change control system for a vehicle, the automated lane change control system comprising:
    a steering system configured to control steering of the vehicle; and
    a controller configured to:
        detect whether a set of preconditions for performing an automated lane change on a roadway are satisfied; and
        when the set of preconditions for performing the automated lane change on the roadway are satisfied, perform the automated lane change by:
            determining a departing lane of the roadway in which the vehicle is currently traveling and a merging lane of the roadway to which the vehicle will be traveling after performing the automated lane change,
            determining a desired yaw rate of the vehicle based on a current speed of the vehicle,
            determining control points for the automated lane change, including:
                (i) determining an end control point (A) in a center of the departing lane,
                (ii) determining an end control point (B) in a center of the merging lane,
                (iii) determining an intermediate control point ($B_{pre}$) along a line ($L_B$) that is tangent to a curvature of the merging lane at control point (B), the intermediate control point ($B_{pre}$) being before end control point (B) with respect to the vehicle's motion,
                (iv) determining an intermediate control point ($A_{post}$) along a line ($L_A$) that is tangent to a curvature of the departing lane at control point (A), the intermediate control point ($A_{post}$) being after end control point (A) with respect to the vehicle's motion,
                (v) determining an intermediate control point ($P_1'$) along a line ($L_1$) that is perpendicular to a line ($AB_{pre}$) connecting end control point (A) point to intermediate control point ($B_{pre}$),
                (vi) determining an intermediate control point ($P_2'$) along another line ($L_2$) that is perpendicular to line ($AB_{pre}$),
            determining a basis spline (B-spline) travel path defined by the six control points to obtain a desired path between the end control points, and
            commanding the steering system such that the vehicle follows the desired path.

2. The automated lane change control system of claim 1, wherein the end control point B is selected such that the following constraint is satisfied:

$$AB/V < (\Theta_1 + \Theta_2)/Y_{des},$$

where AB represents a distance between the end control points A and B, V represents the speed of the vehicle, $\Theta_1$ represents an acute angle between lines $AB_{pre}$ and $L_B$, $\Theta_2$ represents an acute angle between lines $AB_{pre}$ and $L_A$, and $Y_{des}$ represents the desired yaw rate.

3. The automated lane change control system of claim 1, wherein the controller is further configured to:
    determine two points ($p_1$, $p_2$) along line $AB_{pre}$ that are equally spaced between end control point A and intermediate control point $B_{pre}$;
    determine lines $L_1$ and $L_2$ by passing through points $p_1$ and $p_2$, respectively;
    determine the intermediate control points ($P_1$, $P_2$) at intersections between lines $L_1$ and $L_A$ and between lines $L_2$ and $L_B$, respectively; and determine the control points $P_1'$, $P_2'$ by determining mid-points along line $L_1$ between points $p_1$ and $P_1$ and along line $L_2$ between points $p_2$ and $P_2$, respectively.

4. The automated lane change control system of claim 1, further comprising a camera system configured to capture images of the roadway, wherein the controller is further configured to:
   obtain first captured images of the roadway from the camera system;
   detect, based on the first captured images, first lane markers on the roadway corresponding to the departing and merging lanes;
   identify first segments of the departing and merging lanes based on the detected first lane markers in the first captured images; and
   determine the end control points in the departing and merging lanes within the identified first segments.

5. An automated lane change control system for a vehicle, the automated lane change control system comprising:
   a steering system configured to control steering of the vehicle;
   a controller configured to:
      detect whether a set of preconditions for performing an automated lane change on a roadway are satisfied; and
      when the set of preconditions for performing the automated lane change on the roadway are satisfied, perform the automated lane change by:
         determining a departing lane of the roadway in which the vehicle is currently traveling and a merging lane of the roadway to which the vehicle will be traveling after performing the automated lane change,
         determining a desired yaw rate of the vehicle based on a current speed of the vehicle,
         determining an end control point in a center of each of the departing lane and the merging lane,
         determining a set of intermediate control points based on the end control points and the desired yaw rate,
         determining a basis spline (B-spline) travel path defined by the end control points and the set of intermediate control points to obtain a desired path between the end control points, and
         commanding the steering system such that the vehicle follows the desired path; and
   a camera system configured to capture first images of first lane markers of first segments of the roadway to determine the end control points (A, B) in the departing and merging lanes,
   wherein the controller is further configured to after determining the desired path and commanding the steering system to follow the desired path for a period and before the automated lane change is complete:
      obtain second captured images of the roadway from the camera system;
      detect, based on the second captured images, second lane markers on the roadway corresponding to the departing and merging lanes;
      identify second segments of the departing and merging lanes based on the detected second lane markers in the second captured images, wherein the second segments are shorter than the first segments by a distance traveled by the vehicle during the period;
      update the end control point in the merging lane and the set of intermediate control points within the identified segments;
      determine an updated B-spline travel path defined by the end control point in the departing lane, the updated end control point in the merging lane, and the updated set of intermediate control points to obtain an updated desired path; and
      command the steering system such that the vehicle follows the updated desired path.

6. The automated lane change control system of claim 1, wherein the desired yaw rate is a maximum yaw rate of the vehicle at the current speed of the vehicle.

7. The automated lane change control system of claim 1, wherein the set of preconditions comprises at least a portion of the merging lane being free of other vehicles.

8. An automated lane change control method for a vehicle, the method comprising:
   detecting, by a controller of the vehicle, whether a set of preconditions for performing an automated lane change on a roadway are satisfied; and
   when the set of preconditions for performing the automated lane change on the roadway are satisfied, performing the automated lane change by:
      determining, by the controller, a departing lane of the roadway in which the vehicle is currently traveling and a merging lane of the roadway to which the vehicle will be traveling after performing the automated lane change,
      determining, by the controller, a desired yaw rate of the vehicle based on a current speed of the vehicle,
      determining, by the controller, control points for the automated lane change, including:
         (i) determining, by the controller, an end control point (A) in a center of the departing lane,
         (ii) determining, by the controller, an end control point (B) in a center of the merging lane,
         (iii) determining, by the controller, an intermediate control point ($B_{pre}$) along a line ($L_B$) that is tangent to a curvature of the merging lane at control point (B), the intermediate control point ($B_{pre}$) being before end control point (B) with respect to the vehicle's motion,
         (iv) determining, by the controller, an intermediate control point ($A_{post}$) along a line ($L_A$) that is tangent to a curvature of the departing lane at control point (A), the intermediate control point ($A_{post}$) being after end control point (A) with respect to the vehicle's motion,
         (v) determining, by the controller, an intermediate control point ($P_1'$) along a line ($L_1$) that is perpendicular to a line ($AB_{pre}$) connecting end control point (A) point to intermediate control point ($B_{pre}$), and
         (vi) determining, by the controller, an intermediate control point ($P_2'$) along another line ($L_2$) that is perpendicular to line ($AB_{pre}$),
      determining, by the controller, a basis spline (B-spline) travel path defined by the end control points and the set of intermediate control points to obtain a desired path between the end control points, and
      commanding, by the controller, a steering system configured to control steering of the vehicle such that the vehicle follows the desired path.

9. The automated lane change control method of claim 8, wherein the end control point B is selected such that the following constraint is satisfied:

$$AB/V < (\Theta_1 + \Theta_2)/Y_{des},$$

where AB represents a distance between the end control points A and B, V represents the speed of the vehicle, $\Theta_1$ represents an acute angle between lines $AB_{pre}$ and $L_B$, $\Theta_2$ represents an acute angle between lines $AB_{pre}$ and $L_A$, and $Y_{des}$ represents the desired yaw rate.

10. The automated lane change control method of claim 8, further comprising:
  determining, by the controller, two points ($p_1$, $p_2$) along line $AB_{pre}$ that are equally spaced between end control point A and intermediate control point $B_{pre}$;
  determining, by the controller, lines $L_1$ and $L_2$ by passing through points $p_1$ and $p_2$, respectively;
  determining, by the controller, the intermediate control points ($P_1$, $P_2$) at intersections between lines $L_1$ and $L_A$ and between lines $L_2$ and $L_B$, respectively; and
  determining, by the controller, the control points $P_1'$, $P_2'$ by determining mid-points along line $L_1$ between points $p_1$ and $P_1$ and along line $L_2$ between points $p_2$ and $P_2$, respectively.

11. The automated lane change control method of claim 8, further comprising:
  obtaining, by the controller, first captured images of the roadway from a camera system configured to capture images of the roadway;
  detecting, by the controller and based on the first captured images, first lane markers on the roadway corresponding to the departing and merging lanes;
  identifying, by the controller, first segments of the departing and merging lanes based on the detected first lane markers in the first captured images; and
  determining, by the controller, the end control points in the departing and merging lanes within the identified first segments.

12. The automated lane change control method of claim 11, further comprising after determining the desired path and commanding the steering system to follow the desired path for a period and before the automated lane change is complete:
  obtaining, by the controller, second captured images of the roadway from the camera system;
  detecting, by the controller and based on the second captured images, second lane markers on the roadway corresponding to the departing and merging lanes;
  identifying, by the controller, second segments of the departing and merging lanes based on the detected second lane markers in the second captured images, wherein the second segments are shorter than the first segments by a distance traveled by the vehicle during the period;
  updating, by the controller, the end control point in the merging lane and the set of intermediate control points within the identified segments;
  determining, by the controller, a B-spline defined by the end control point in the departing lane, the updated end control point in the merging lane, and the updated set of intermediate control points to obtain an updated desired path; and
  commanding, by the controller, the steering system such that the vehicle follows the updated desired path.

13. The automated lane change control method of claim 8, wherein the desired yaw rate is a maximum yaw rate of the vehicle at the current speed of the vehicle.

14. The automated lane change control method of claim 8, wherein the set of preconditions comprises at least a portion of the merging lane being free of other vehicles.

* * * * *